(12) United States Patent
Clifton

(10) Patent No.: US 11,787,705 B2
(45) Date of Patent: Oct. 17, 2023

(54) APPARATUS AND METHODS FOR ENHANCING MOLECULAR OSCILLATION FOR REMOVING CHLORINE IN WATER

(71) Applicant: Jeffrey T. Clifton, Aledo, TX (US)

(72) Inventor: Jeffrey T. Clifton, Aledo, TX (US)

(*) Notice: Subject to any disclaimer, the term of this patent is extended or adjusted under 35 U.S.C. 154(b) by 42 days.

(21) Appl. No.: 17/962,684

(22) Filed: Oct. 10, 2022

(65) Prior Publication Data
US 2023/0032850 A1   Feb. 2, 2023

Related U.S. Application Data

(63) Continuation-in-part of application No. 16/788,294, filed on Feb. 11, 2020.

(60) Provisional application No. 63/356,464, filed on Jun. 28, 2022, provisional application No. 62/804,043, filed on Feb. 11, 2019.

(51) Int. Cl.
| | |
|---|---|
| C02F 1/00 | (2023.01) |
| C02F 1/30 | (2023.01) |
| C02F 101/12 | (2006.01) |
| C02F 1/68 | (2023.01) |

(52) U.S. Cl.
CPC ............. *C02F 1/30* (2013.01); *C02F 1/008* (2013.01); *C02F 1/68* (2013.01); *C02F 2101/12* (2013.01); *C02F 2201/005* (2013.01); *C02F 2209/02* (2013.01); *C02F 2209/05* (2013.01); *C02F 2209/06* (2013.01); *C02F 2209/24* (2013.01); *C02F 2209/42* (2013.01); *C02F 2301/046* (2013.01); *C02F 2303/10* (2013.01)

(58) Field of Classification Search
CPC .............................. C02F 1/48; C02F 2303/10
See application file for complete search history.

(56) References Cited

U.S. PATENT DOCUMENTS

| | | | |
|---|---|---|---|
| 9,581,021 | B2 | 2/2017 | Ethridge |
| 2004/0050682 | A1 | 3/2004 | Paskalov et al. |
| 2006/0086603 | A1 | 4/2006 | Wyles |
| 2013/0087287 | A1* | 4/2013 | Hur et al. ......... H01J 37/32834 |
| | | | 156/345.44 |

FOREIGN PATENT DOCUMENTS

WO     2009108045  A1    9/2009

OTHER PUBLICATIONS

Colic, Miroslav et al.; "Effects of amplitude of the radiofrequency electromagnetic radiation on aqueous suspensions and solutions"; Journal of colloid and interface science 200.2 (1998); pp. 265-272.

* cited by examiner

*Primary Examiner* — Bradley R Spies
(74) *Attorney, Agent, or Firm* — HULSEY P.C.

(57) ABSTRACT

An apparatus and a method for treating saltwater and removing chlorine in water to make a variety of sodium-based byproducts and chlorine gas is disclosed. The apparatus comprises a feed tank for receiving water. The feed tank is coupled to a plurality of Radio frequency (RF) chambers. Each of the RF chambers comprises an inlet and an outlet. The outlet is coupled to a treated water effluent manifold. Further, each RF chamber is coupled to a vacuum manifold. Each RF chamber comprises a recirculation pipe to pump water back into the feed tank. The RF chamber comprises a RF system used for bombarding RF energy at predefined frequencies on the water in order to liberate chlorine isotope. Additionally, the RF system bombards RF energy to stretch hydrogen bond in the saltwater to a point of breaking a molecule by applying low pressure. The hydrogen bond captures chlorine. Subsequently, the water is sent through the outlet to the treated water effluent manifold.

16 Claims, 11 Drawing Sheets

APPARATUS AND METHODS FOR ENHANCING MOLECULAR OSCILLATION FOR REMOVING CHLORINE IN WATER

This application is a continuation-in-part of U.S. Application No. 16/788,294, filed Feb. 11, 2020; which claims the benefit of U.S. Provisional Application No. 62/804,043, filed Feb. 11, 2019; and claims the benefit of U.S. Provisional Application No. 63/356,464, filed Jun. 28, 2022; all of which are incorporated herein by reference.

FIELD OF THE INVENTION

The present invention generally relates to an apparatus for removing chlorine in water. More particularly, the present invention relates to an apparatus for treating water or saltwater by liberating chlorine isotope using a Radio frequency (RF) system and removing sodium from the water to make a variety of sodiumbased products such as soda ash, for example.

DESCRIPTION OF THE RELATED ART

It is known that presence of hazardous chemicals and soil composition in water effects when human beings or animals consume the water. As such, it is very important to treat water before it is consumed.

Several methods and systems have been proposed in the past, which allow treating ground water or seawater. One such method includes removing chlorine in the water. An exemplary method is disclosed in a U.S. Grated Pat. 9,581,021, entitled "System for Extraction of Volatiles from Planetary Bodies Using Microwave and RF Processes" ("the '021 Patent"). The '021 Patent discloses a system for extraction of volatiles from bodies in a vacuum. The volatile containing solid may be subsurface heated with microwave or RF energy subliming volatiles that are captured with a containment structure that directs the flow of the volatile through a cold trap for collecting and condensing the volatile. In one variation, a sample, or an entire body may be enveloped in a sealed container for extraction of volatiles that are then collected and condensed. In a further variation, a planetary surface area is covered and the perimeter sealed at the surface. The area is then heated from above to release volatiles that are then collected and condensed. To heat layers below the surface that contain high concentrations of volatiles, a hollow auger can gain access to the subsurface volatile and microwave or RF energy can be delivered down the hollow auger with a coax cable and vapor can escape through the hollow auger to a capture apparatus.

Although the disclosure presented above, and other similar disclosures that are known are useful in treating water, they have several problems. This is because; the disclosures of above type cannot break the ionic bond between the sodium and chlorine molecules, and carbon dioxide in the water. As a result, the water is not treated completely and chlorine is not removed from the water.

Other documents describing the closest subject matter provide for a number of more or less complicated features that fail to solve the problem in an efficient and economical way. None of these patents suggest the novel features of the present invention. Specifically, none of the disclosures in the art disclose an apparatus for treating water, which uses a RF system to liberate chlorine isotope.

Therefore, there is a need in the art for an apparatus for treating water, which uses a RF system to liberate chlorine isotope and remove sodium from saltwater to make a variety of sodium-based byproducts.

SUMMARY

It is one of the main objects of the present invention to provide an apparatus for treating water and that avoids the drawbacks of the prior art.

It is another object of the present invention to provide an apparatus for treating water by liberating chlorine isotope using a Radio frequency (RF) system.

It is another object of the present invention to provide an apparatus for removing chlorine in water to make a variety of sodium-based byproducts and chlorine gas.

In order to overcome the limitations here stated, the present invention provides an apparatus for treating water by liberating chlorine isotope using a Radio frequency (RF) system and removing chlorine in water to make a variety of sodium-based byproducts and chlorine gas. The apparatus comprises a feed tank for receiving water (saltwater). The feed tank is coupled to a plurality of RF chambers. Each of the RF chambers comprises an inlet and an outlet. The outlet is coupled to a treated water effluent manifold. Further, each RF chamber is coupled to a vacuum manifold. Each RF chamber comprises a recirculation pipe to pump water back into the feed tank. The RF chamber comprises a RF system used for bombarding RF energy at predefined frequencies on the water to liberate chlorine isotope. Subsequently, the water is sent through the outlet to the treated water effluent manifold.

The apparatus further includes a control system that electrically connects to the RF chamber and/or RF system. The control system monitors saltwater level, pH level, temperature, and salt concentration in the saltwater in the RF chamber and controls the feed tank supplying the water, a recirculation pipe supplying excess saltwater in the RF chamber back into the feed tank, and chemical make-up of the saltwater in the RF chamber.

The apparatus allows to change the frequency of RF energy to target different element in order to break the atom of molecular chain (elements such as chlorine, hydrogen, oxygen, etc.).

In one implementation, the control system operates the RF system to bombard RF energy at about 400 to 700 watts to remove sodium chloride from the saltwater in order to make a variety of sodium-based byproducts and chlorine gas.

Further, the apparatus includes a gas injection manifold. The gas injection manifold stores chemicals such as carbon dioxide, carbon powder, and hydrogen gas. The gas injection manifold connects to the RF chamber via an injector tube. The injector tube includes an injector tube valve to control the flow of the chemicals into the RF chamber and to prevent a violent sodium-water reaction.

In one advantageous feature of the present invention, the RF system uses RF energy at particular or different frequencies to liberate chlorine isotope. The chlorine isotope gets collected at a chlorine gas discharge system.

In another advantageous feature of the present invention, the RF system focuses the RF energy towards the salt solution i.e., the water (remaining still or passing through the chamber tubes) to capture remaining RF energy by a faraday cage and to direct the captured RF energy to a power amplifier to resupply the RF energy.

In another advantageous feature of the present invention, the control system operates the RF system to bombard the RF energy at about 400 to 700 watts to stretch hydrogen bond in the saltwater to a point of breaking a molecule by applying low pressure. The hydrogen bond stretched captures chlorine. This way, the apparatus enhances the molecular oscillation for removing sodium chloride from the saltwater.

Features and advantages of the invention hereof will become more apparent in light of the following detailed description of selected embodiments, as illustrated in the accompanying FIGUREs. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

With the above and other related objects in view, the invention consists in the details of construction and combination of parts as will be more fully understood from the following description, when read in conjunction with the accompanying drawings in which.

DESCRIPTION OF THE EMBODIMENTS OF THE INVENTION

Figure 1:
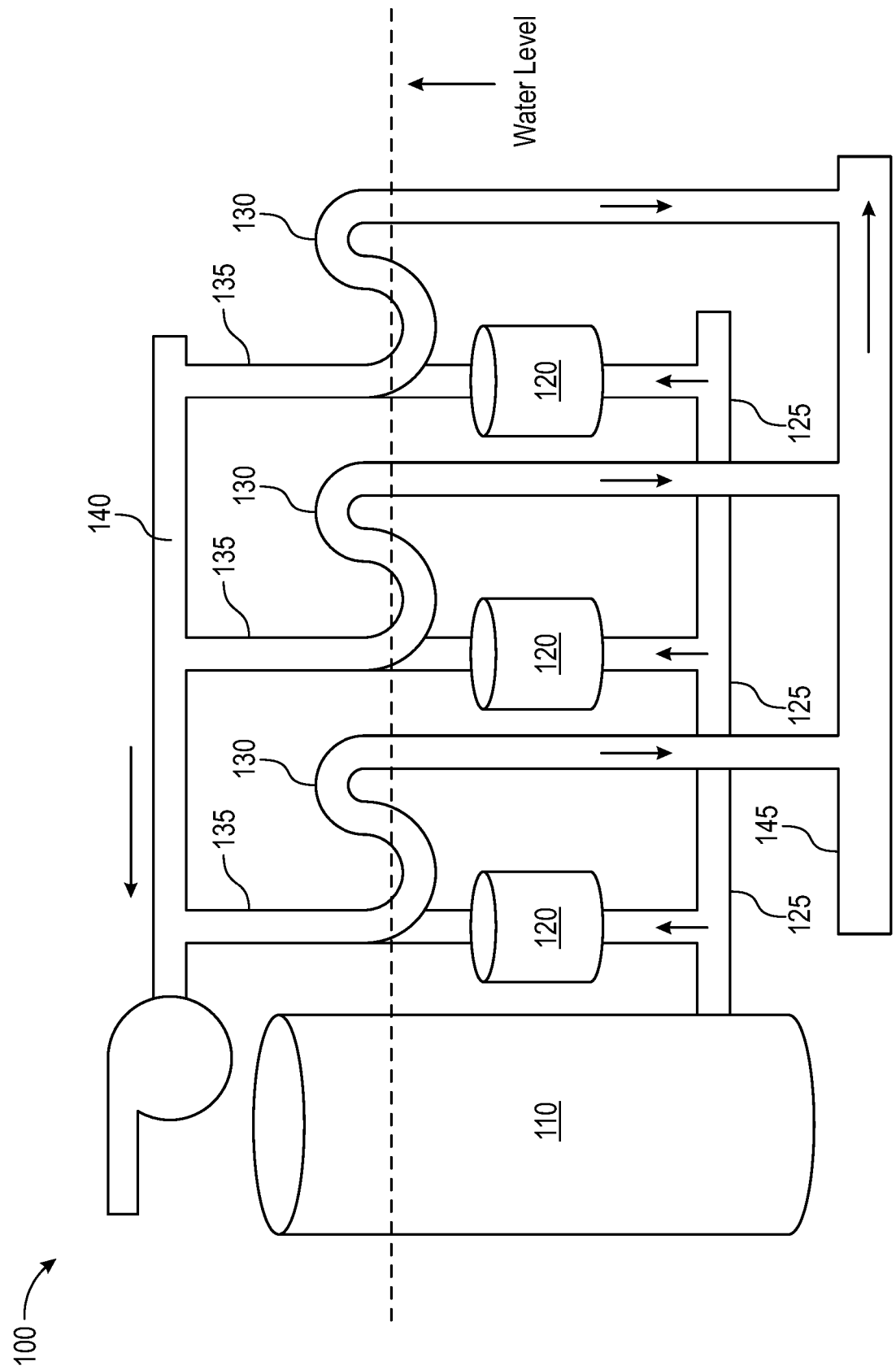
FIG. 1 illustrates a schematic diagram of an apparatus comprising a feed tank and a plurality of Radio frequency (RF) chambers for treating water, in accordance with one embodiment of the present invention.

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed apparatus. However, it will be apparent to those skilled in the art that the presently disclosed invention may be practiced without these specific details. In some instances, well-known structures and devices are shown in functional or conceptual diagram form in order to avoid obscuring the concepts of the presently disclosed apparatus.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of an apparatus for treating saltwater, it is to be further understood that numerous changes may arise in the details of the embodiments of the apparatus. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present invention discloses an apparatus for removing chlorine in water to make a variety of sodium-based byproducts and chlorine gas. The apparatus comprises a feed tank for receiving water. The feed tank is coupled to a plurality of Radio frequency (RF) chambers. Each of the RF chambers comprises an inlet and an outlet. The outlet is coupled to a treated water effluent manifold. Further, each RF chamber is coupled to a vacuum manifold. Each RF chamber comprises a recirculation pipe to pump water back into the feed tank. The RF chamber comprises a RF system used for bombarding RF energy at predefined frequencies on the water in order to liberate chlorine isotope. Additionally, the RF system bombards RF energy to stretch hydrogen bond in the saltwater to a point of breaking a molecule by applying low pressure. The hydrogen bond captures chlorine. Subsequently, the water is sent through the outlet to the treated water effluent manifold.

Various features and embodiments of an apparatus for removing chlorine in water to make a variety of sodium-based byproducts and chlorine gas are explained in conjunction with the description of FIGS. 1-14.

Referring to FIG. 1, a schematic diagram of an apparatus 100 for treating water is shown, in accordance with one embodiment of the present invention. Apparatus 100 includes a feed tank 110. Feed tank 110 stores saltwater. Feed tank 110 comes in a cylindrical or any other suitable structure depending on the need. Further, the size of feed tank 110 is selected depending on the need. For instance, the size of feed tank 110 is selected based on nominal effluent volume. In one example, consider the nominal effluent volume needed is 1500/gpm/5600/lpm, then feed tank 110 capable of holding 8000 gallons of water is selected.

Feed tank 110 receives saltwater from a variety of sources. In case the source of the water is produced water, then water is passed through an oil/water separator, then through a 200-micron filtration system. Further, if the feed water is from a natural source such as an open sea water, lake, etc., then the water is made to pass through an ¼ inch strainer to strain out large debris, and then through a 20-micron filtration system. At feed tank 110, carbon dioxide gas is added in the water for preprocessing. Here, the water is preprocessed to lower the pH of the water and to entrain the carbon dioxide for use later in the process.

In one example, feed tank 110 connects to a saltwater feed manifold or pipe (not shown). The saltwater feed manifold is sized to deliver 110% of rated capacity. For example, the saltwater feed manifold has a minimum 10 inch inside diameter. The saltwater feed manifold is made of a poly vinyl chloride schedule 80 medium temperature plastic pipe. The size of the saltwater feed manifold depends upon the density of the water. The saltwater feed manifold includes a small diameter pipe reducing connections along the length of the saltwater feed manifold. The small diameter pipe directs the saltwater into RF chambers 120.

Apparatus 100 further includes a plurality of Radio frequency (RF) chambers 120. Each RF chamber 120 encompasses an inlet 125 for receiving saltwater into it. Further, each of the RF chambers 120 includes an outlet 130. In addition, each of the RF chambers 120 includes a vacuum tube 135. Vacuum tube 135 couples to a vacuum manifold 140. Outlet 130 couples to a treated water effluent manifold 145.

Figure 2:
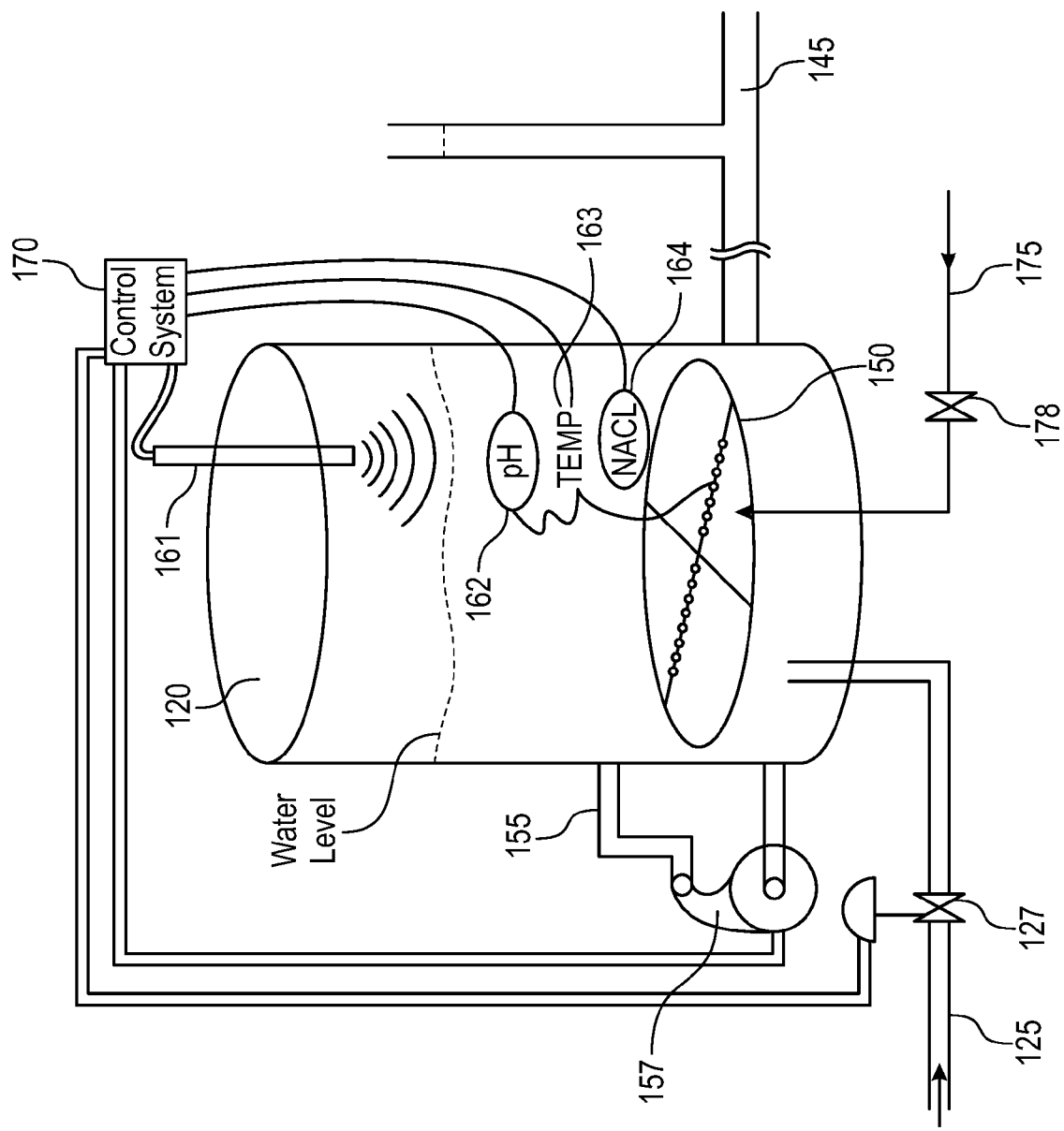
FIG. 2 illustrates a schematic diagram of the feed tank coupled to a RF chamber, in accordance with one embodiment of the present invention.
Figure 3:
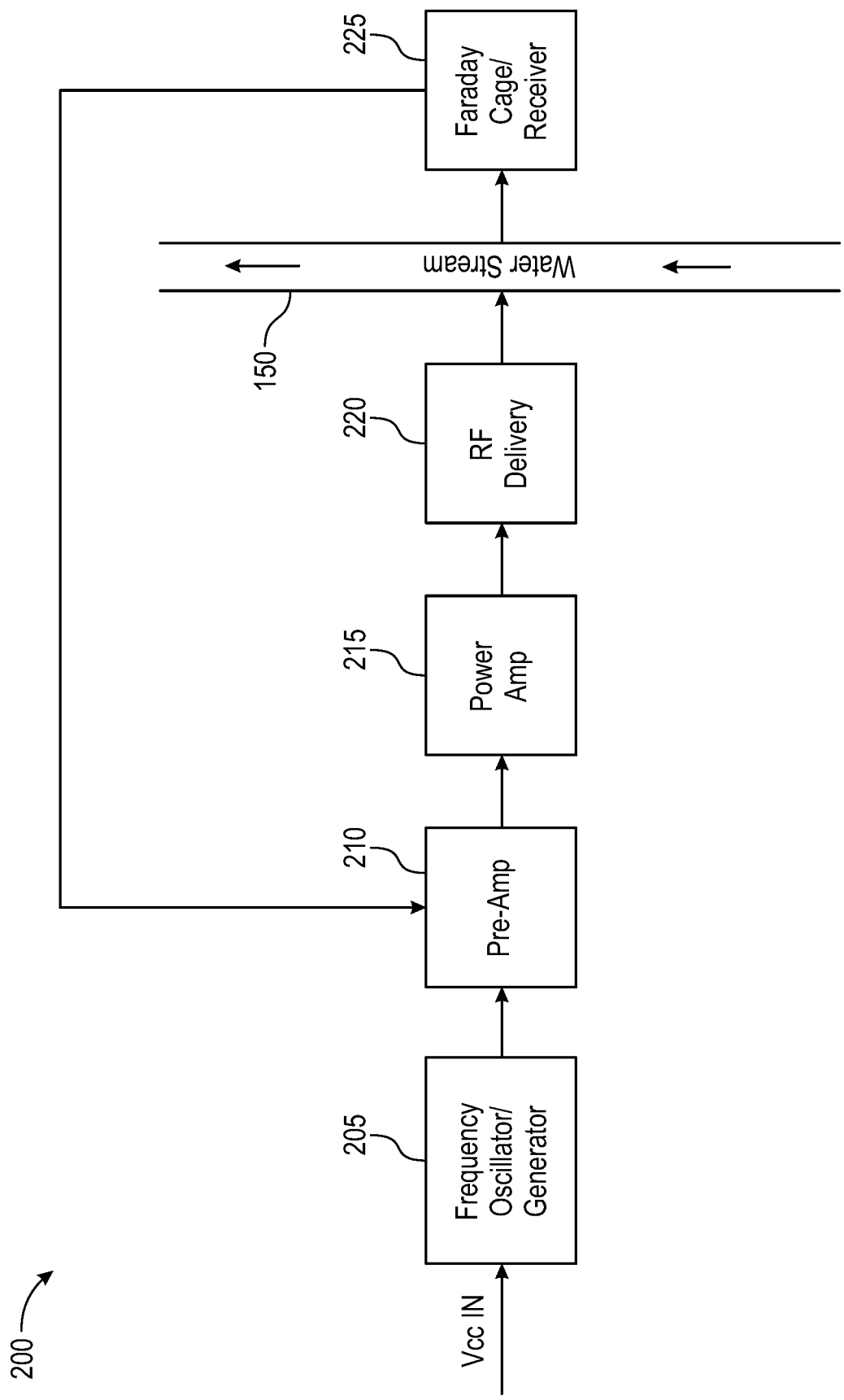
FIG. 3 illustrates a RF system used for bombarding RF energy at water, in accordance with one embodiment of the present invention.

Now referring to FIG. 2, the constructional features of RF chamber 120 is explained, in accordance with one embodiment of the present invention. RF chamber 120 includes an inlet valve 127. Inlet valve 127 positions at inlet 125 to control the flow of water into RF chamber 120. RF chamber 120 encompasses chamber tubes 150 (FIGS. 2 and 3). Chamber tubes 150 receive the saltwater inside RF chamber 120. Chamber tubes 150 are provided in a coiled manner such that the saltwater is raised to top of RF chamber 120.

In one implementation, RF chamber 120 includes a recirculation pipe 155. Recirculation pipe 155 positions in proximity to feed tank 110 and helps to return excess water in RF chamber 120 to feed tank 110. In other words, recirculation pipe 155 pumps water back into feed tank 110. Further, RF chamber 120 presents a pump 157. Pump 157 connects to recirculation pipe 155 and helps to pump the water from RF chamber 120 to feed tank 110. In one example, pump 157 pumps water at 60 gallons per minute (gpm)/227 liters per minute (lpm) flow rate. Here, recirculation pipe 155 operates with the help of pump 157 to turn the water over one time every 10 minutes. Further, control system 170 operates inlet valve 127 to admit water into feed tank 110. The water travels from feed tank 110 to the saltwater feed manifold and then water is made to rise into chamber tubes 150. The level of the saltwater in chamber tube 150 is equal to the water level in feed tank 110, as indicated/shown in FIG. 1. This is based on Pascal's Principle for hydrostatic pressure. As per Pascal's Principle, force applied to any contained fluid is distributed throughout the system. When a force is applied, the pressure increases equally in all directions throughout the fluid (hydraulic systems).

$$\frac{F_1}{A_1} = \frac{F_2}{A_2}$$

Using Pascal's Principle, automated pumps, valves, and associated controls are not required.

RF chamber 120 further includes a plurality of sensors. Plurality of sensors include a water level i.e., ultrasonic level indicator 161, a pH/carbon dioxide indicator 162, a temperature sensor 163, a conductivity (sodium) indicator 164 and a salt concentration indicator (not shown). Each of ultrasonic level indicator 161, pH/carbon dioxide indicator 162, temperature sensor 163, conductivity (sodium) indicator 164 and salt concentration indicator couples to a control system 170. It should be understood that ultrasonic level indicator 161 determines water level in RF chamber 120. The pH/carbon dioxide indicator 162 determines the pH content/level in the water in RF chamber 120. Temperature sensor 163 determines the temperature of water in RF chamber 120. Conductivity (sodium) indicator 164 determines sodium content in water in RF chamber 120. The salt concentration indicator determines salt concentration in the water.

Control system 170 indicates a computer or controller used to operate and control the function of RF chamber 120. In one implementation, control system 170 electrically couples to inlet valve 127, and pump 157. In addition, control system 170 electrically couples to each of ultrasonic level indicator 161, pH/carbon dioxide indicator 162, temperature sensor 163, conductivity (sodium) indicator 164 and the salt concentration indicator. In accordance with the present invention, control system 170 monitors water level via ultrasonic level indicator 161, pH/carbon dioxide via a pH/carbon dioxide indicator 162, temperature via temperature sensor 163, conductivity (sodium) via conductivity indicator 164 and salt concentration via salt concentration indicator. Further, control system 170 controls inlet valve 127, pump 157 and chemical make-up of the water in RF chamber 120.

Further, RF chamber 120 includes a gas injection manifold or chemical injection manifold 175 for storing chemicals. In one example, gas injection manifold 175 stores gases/chemicals such as carbon dioxide, carbon powder, oxygen or even hydrogen gas. Gas injection manifold 175 couples to the RF chamber 120 via an injector tube (not shown). The injector tube includes an injector tube valve 178 to control the flow of the chemicals injected into RF chamber 120 or the chamber tubes 150.

FIG. 3 shows a block diagram of a RF system 200 incorporated in RF chamber 120, in accordance with one embodiment of the present invention. RF system 200 includes a frequency Oscillator/Generator 205, a Pre-Amplifier 210, a power Amplifier 215, a RF delivery system 220 and a Faraday Cage/Receiver 225. It should be understood that RF delivery system 220 and Faraday Cage/Receiver 225 are placed in such a way that chamber tube 150 passes between them. It should be understood that RF system 200 operates with the help of control system 170. RF delivery system 220 includes a ferrite cylinder. In one example, RF delivery system 220 has a 2″ inside diameter, 2¾″ outside diameter, 6″ tall, and wrapped 6 times with an enameled wire. In another example, RF delivery system 220 has a 4″ inside diameter, depending on the need. RF delivery system 220 emits RF energy to the saltwater in RF chamber 120. The frequency at which RF delivery system 220 emits RF energy depends on the target (ionic) bond. In one example, RF delivery system 220 emits RF energy of 8.156 MHz for chlorine isotope (35). In another example, RF delivery system 220 emits RF energy of 9.790 MHz for chlorine isotope (37).

In operation, when the water enters RF chamber 120, RF system 200 bombards RF energy on the water passing in chamber tube 150 as shown in FIG. 3. The water is bombarded with RF energy at predefined frequencies. The predefined frequencies include, but not limited to, 8.156 MHz and 9.790 MHz. It should be understood that the target isotope determines the specific frequency required for the process desired. When the water is subjected to the RF bombardment, the atom or isotope targeted begins to resonate. When the isotope resonates, the atom (molecule) breaks apart from its ionic bond to its non-bonded state. When a chlorine isotope is liberated from the chlorine-sodium molecule, a suitable substitute has to be added to prevent a violent sodium-water reaction. Depending on geographic location or region of in which apparatus 100 is used, different compounds are added to the saltwater feed tank to accomplish this goal, such as carbon dioxide, carbon powder, hydrogen or oxygen gas. If carbon powder or carbon dioxide is added, the resulting compound is sodium carbonate. If hydrogen is added, then the resulting compound is sodium hydroxide.

It should be understood that the RF energy is focused towards the salt solution i.e., the water passing through the chamber tubes 150, such that any remaining RF energy is captured by faraday cage 225 and gets directed to an attenuator (not shown) which feeds it back into power amplifier 210.

After the RF energy breaks the ionic bond between the sodium and chlorine molecules, carbon dioxide (introduced in the saltwater feed tank) bonds ionically with the sodium. As a result of the RF energy bombardment, the chlorine in its excited state does not rebind with sodium. Since the upper third (upper portion) of RF chamber 120 is in a vacuum, the newly liberated chlorine comes out of the solution into the vacuum area and draws up into vacuum manifold 140. Once the chlorine is in the vacuum manifold 140, the chlorine gas gets directed to the inlet of a chlorine compressor (not shown), where the chlorine gas gets stored. In other words, top 30% of RF chamber 120 is under a vacuum of mercury. This atmospheric pressure change reduces the surface tension of the water, which makes it easier to release chlorine. Operating the upper $\frac{1}{3}^{rd}$ portion under a vacuum allows assisting RF system 200 in liberating the chlorine isotope. The chlorine isotope liberated is routed through and collected at the chlorine gas discharge system.

After the RF energy breaks the ionic bond between the sodium and chlorine molecules, carbon dioxide (introduced in the saltwater feed tank) bonds ionically with the sodium. The solution, which is now clear of chlorine, goes into a syphon loop. The function of the loop is to allow the effluent stream a path while not allowing a leak into the vacuum system. Once the effluent has passed through the syphon loop, it is directed towards treated water manifold 145 where it will be stored for further (conventional purification steps) treatment.

As explained above, RF chamber 120 includes outlet 130, which is provided in a U-shape. Outlet 130 relies on the Clausius-Clapeyron equation to estimate and ultimately control vapor pressure of the water. As known, Clausius-Clapeyron is a mathematical model for pressure increase, as a function of temperature increases. The vaporization curves of most liquids have a similar shape; vapor pressure increase as temperature increases. The Clausius-Clapeyron equation provides an estimate of vapor pressure at any temperature if vapor pressure is known at one temperature, and if the enthalpy of vaporization (thermodynamic quantity equivalent to the total heat content of a system) is known. As such, the Clausius-Clapeyron Equation is provided as below:

$$P = A \exp\left(- DH_{vap} / R\ T\right)$$

Where: Pressure=P
Enthalpy of vaporization = $DH_{vap}$
Temperature = T
R (= 8.3145 J mol$^{-1}$ K$^{-1}$)
A are the gas constant and unknown constant.
If $P_1$ and $P_2$ are the pressures at two temperatures $T_1$ and $T_2$, the equation has the form:

$$\ln\left(P_1/P_2\right) = DH_{vap}/R \times 1/T_2 \times 1/\ T_1$$

Based on the above Clausius-Clapeyron equation, once the water passes through the series of U-shaped outlets 130, the water is dumped into treated water effluent manifold 145 and then onto a treated water storage tank (not shown). Once the water is in the treated water storage tank, the water is routed through a filtration system (not shown) to remove sodium-carbonate or sodium-hydroxide. Once collected, the water is sent to the storage tank for disinfecting.

Figure 4:
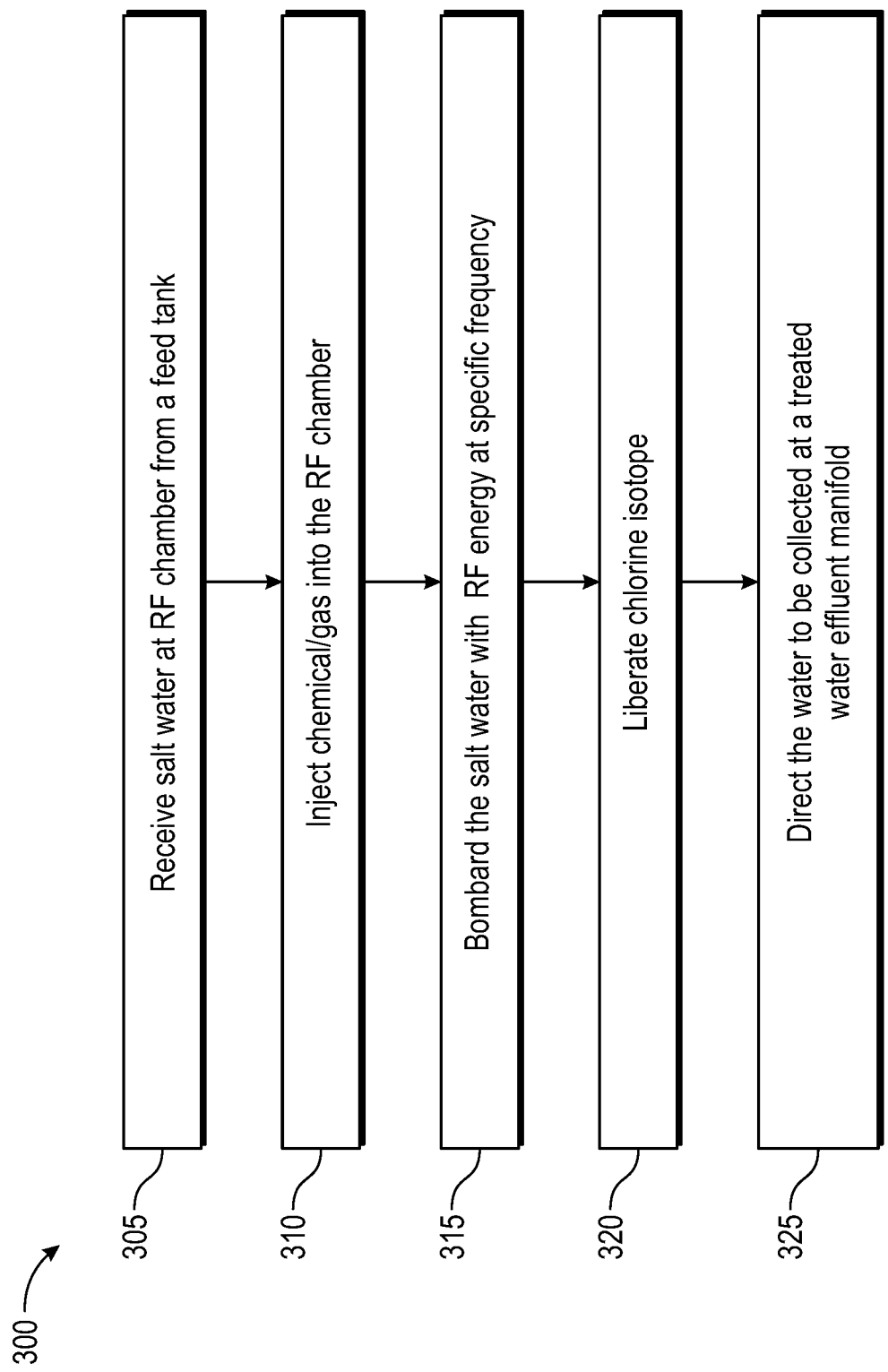
FIG. 4 illustrates a method of treating water, in accordance with one embodiment of the present invention.

Referring to FIG. 4, a method 300 of treating water is shown in accordance with one embodiment of the present invention. The order in which the method 300 is described and is not intended to be construed as a limitation, and any number of the described method blocks can be combined in any order to implement the method 300 or alternate methods. Additionally, individual blocks may be deleted from the method 300 without departing from the scope of the disclosure described herein.

At step 305, water is received at RF chamber 120 from feed tank 110.

At step 310, chemical or gas is injected into RF chamber 120 or chamber tube 150.

At step 315, RF energy is bombarded at the water flowing through chamber tube 150 with the help of RF system 200. In an alternate embodiment, the RF energy is bombarded first and then the chemical/gas is injected to prevent a violent sodium-water reaction.

At step 320, is liberated and collected at the chlorine gas discharge system.

At step 325, the water is directed and collected at the water effluent manifold 145 through the outlet 130.

Figure 5:
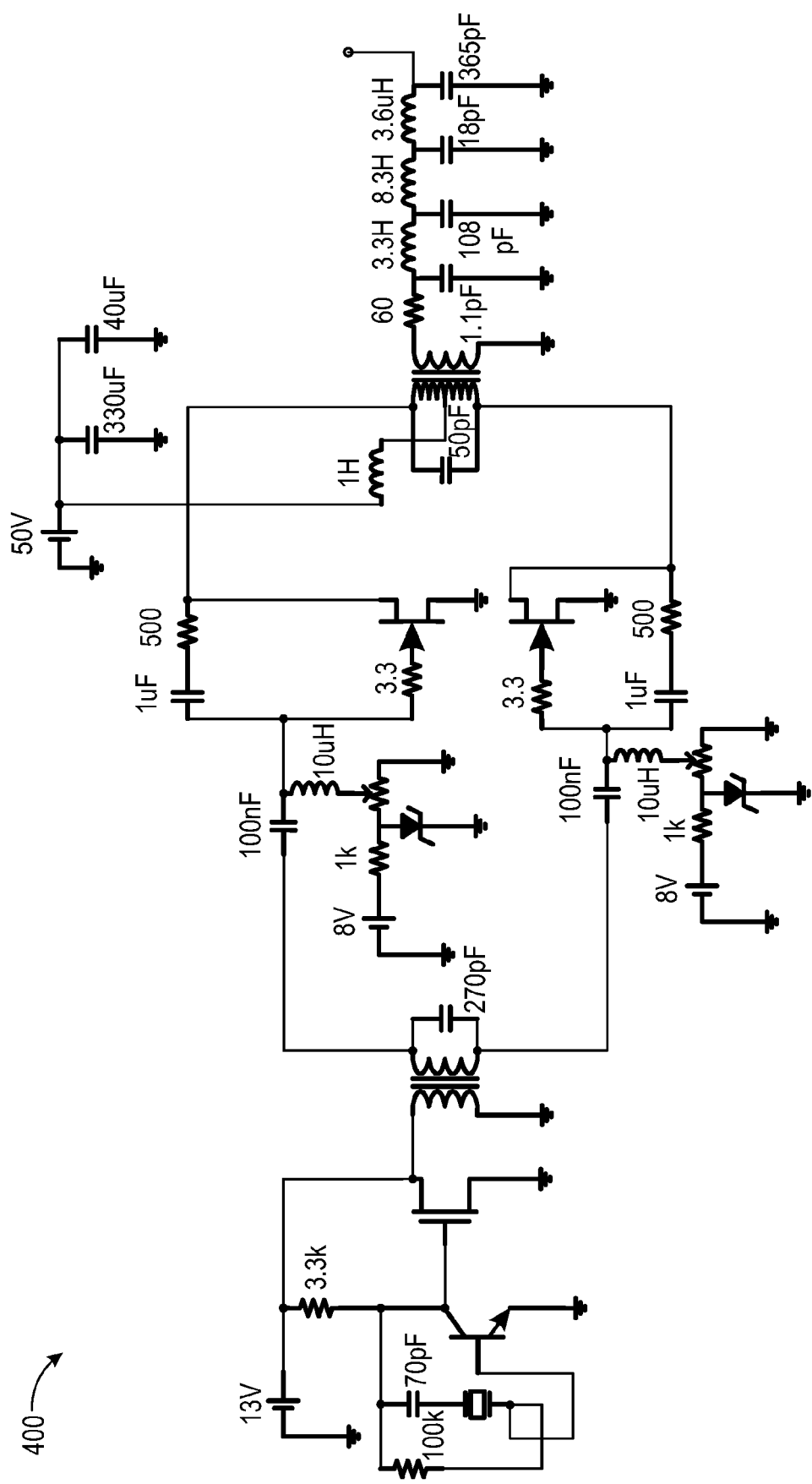
FIG. 5 illustrates an electrical schematic for a circuit for performing the presently disclosed method of treating water, in accordance with one exemplar embodiment of the present invention.

FIG. 5 illustrates an electrical schematic for a circuit 400 for performing the presently disclosed method 300 of treating water, in accordance with one exemplary embodiment of the present invention.

Figure 6:
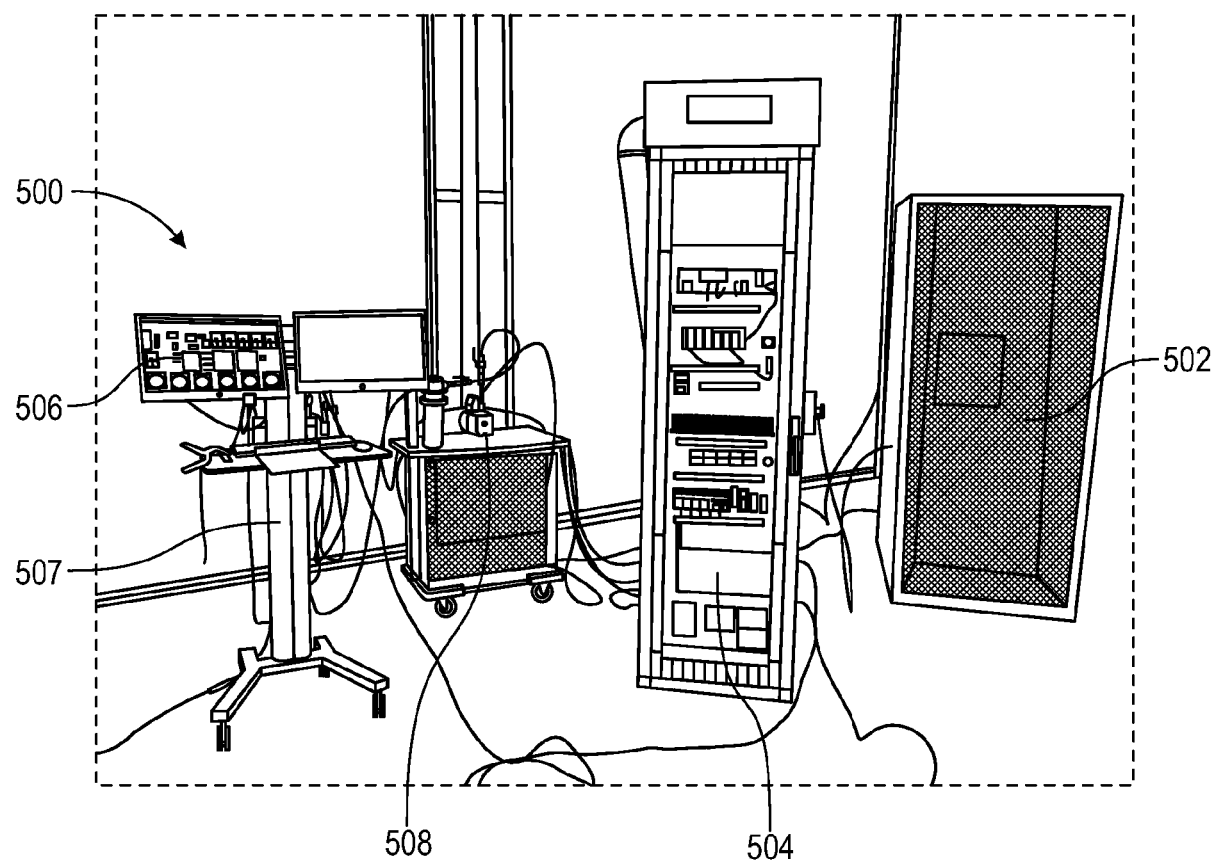
FIG. 6 illustrates an environment of an experimental setup of an apparatus for enhancing molecular oscillation for removing chlorine in water, in accordance with one exemplary embodiment of the present invention.
Figure 12:
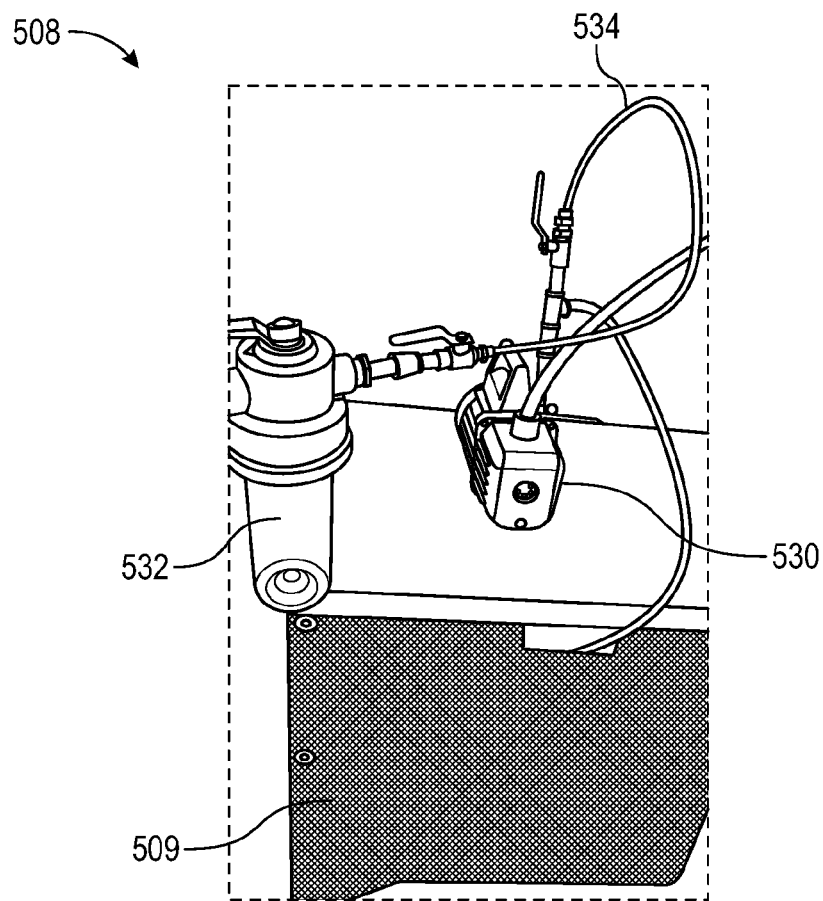
FIG. 12 illustrates a perspective view of a pump assembly, in accordance with one exemplary embodiment of the present invention.

FIG. 6 shows an environment of an apparatus 500, in accordance with one exemplary embodiment of the present invention. Apparatus 500 includes a faraday cage 502, a control system 504, a display system 506, and a pump assembly 508. As can be seen, display system 506 rests over a first wheeled table 507. Further, pump assembly 508 rests over a second wheeled table 509 (as shown in FIG. 12).

Figure 7:
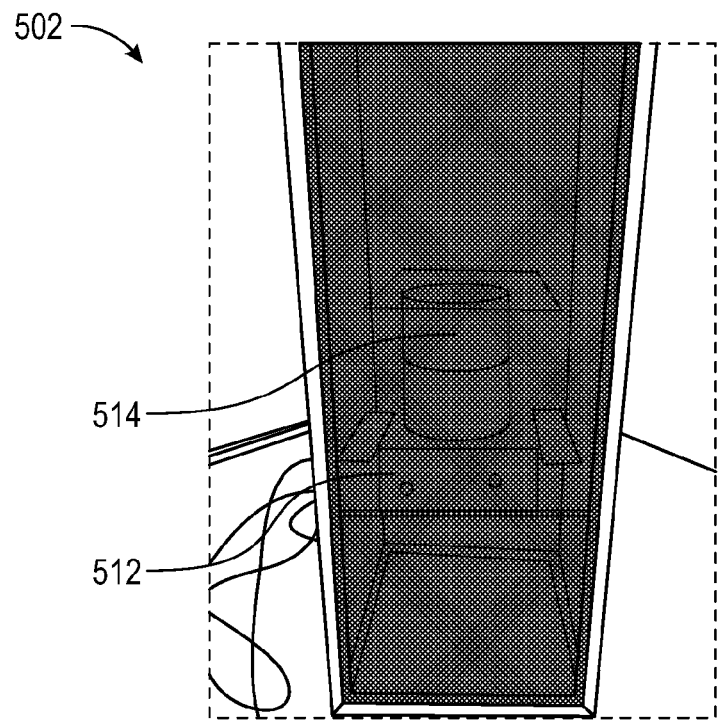
FIGS. 7 and 8 illustrate a closed and open configuration, respectively of a faraday cage, in accordance with one exemplary embodiment of the present invention.
Figure 8:
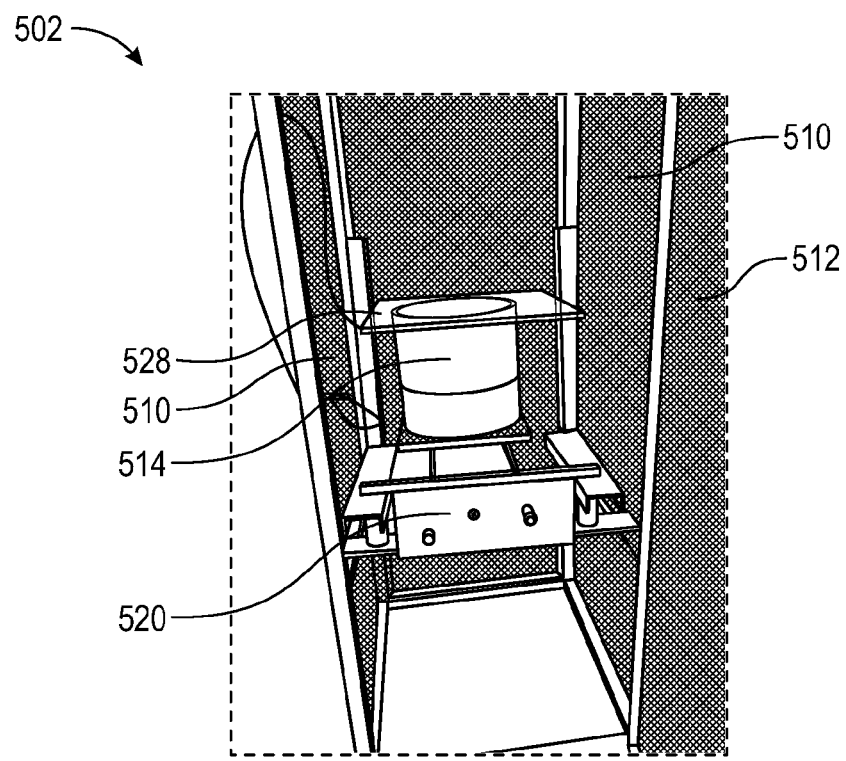
Figure 9:
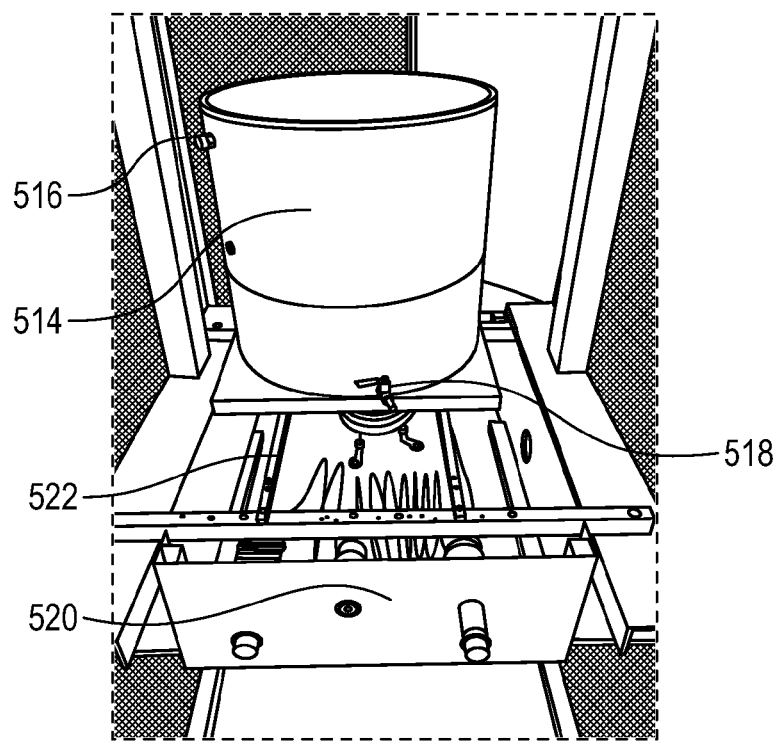
FIG. 9 illustrates RF chamber placed on a housing in the faraday cage, in accordance with one exemplary embodiment of the present invention.

Faraday cage 502 encompasses upstanding walls 510. Walls 510 extend from three sides and presents a door 512 for accessing interior of faraday cage 502. FIGS. 7 and 8 show a perspective view of faraday cage 502 in closed position (door 512 closed, in FIG. 7) and in open position (door 512 opened, in FIG. 8), respectively. Faraday cage 502 receives a RF chamber 514. RF chamber 514 comes in a cylindrical configuration and is made of suitable material. RF chamber 514 includes a recirculation pipe (not shown), vacuum system core or outlet 516 and inlet 518. RF chamber 514 rests on a housing 520, as shown in at least FIGS. 8, 9 and 10. Housing 520 encompasses support members 522. Support members 522 extend horizontally and allow to place RF chamber 514 over them. Support members 522 provide a material made of metal. Support members 522 include cushion members 523. Cushion members 523 indicate a soft and heat resistant material. Cushion members 523 receive support members 522 and allow to place RF chamber 514 over them. In other words, cushion members 523 act as sleeves for support members 522 and come in contact with RF chamber 514 when RF chamber 514 is placed over them.

Figure 10:
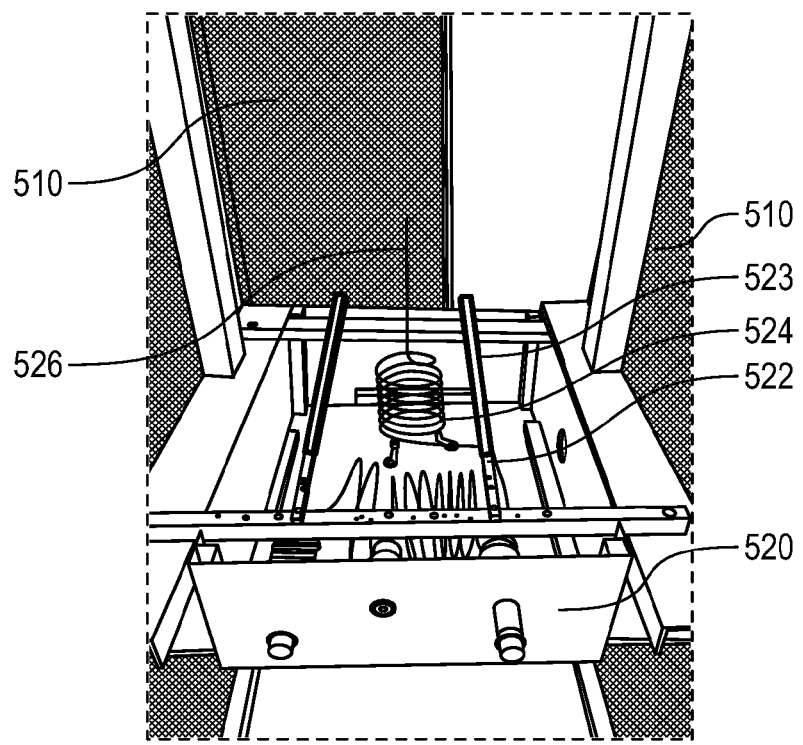
FIG. 10 illustrates a perspective view of the housing, in accordance with one exemplary embodiment of the present invention.
Figure 13:
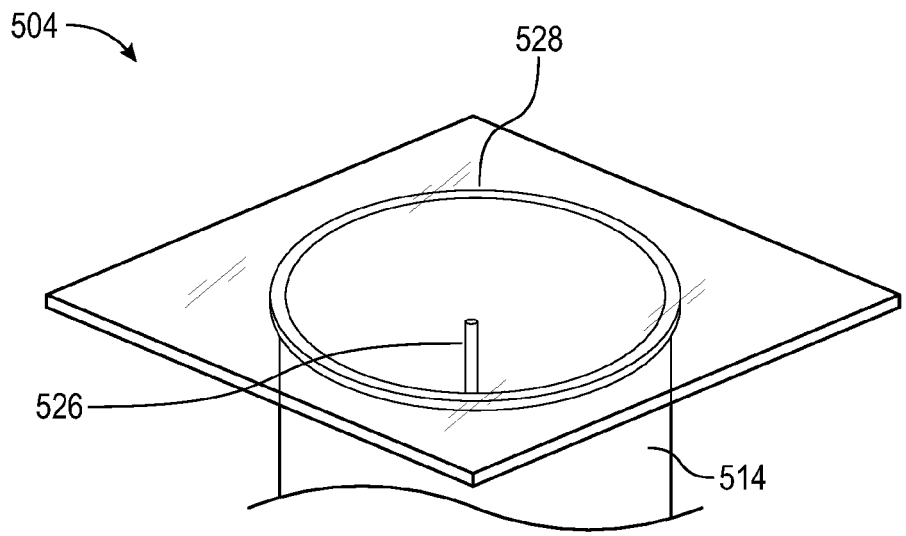
FIG. 13 illustrates nucleation process for enhancing molecular oscillation for removing chlorine in water in the RF chamber, in accordance with one exemplary embodiment of the present invention.

RF chamber 514 includes chamber tube 524. Chamber tube 524 comes in a coiled manner, as shown in at least FIGS. 9 and 10. At the end, chamber tube 524 encompasses RF delivery system or antenna 526, as shown in FIG. 13, for example. Here, RF delivery system 526 is put inside RF chamber 514. As specified above, RF delivery system 526 includes a ferrite cylinder that wraps around chamber tube 524, as shown in FIG. 10, for example. RF delivery system 526 is capable of withstanding high voltage without impeding the functioning of RF chamber 514. RF delivery system 526 is waterproof and does not impede the delivery of RF energy. RF delivery system 220 has a suitable diameter at its inside and outside, and length depending on the need. In the present embodiment, RF delivery system 526 positions slightly above water in RF chamber 514. Here, RF delivery system 526 is operated at about 400 to 700 watt(s). During the delivery of the RF energy, the reaction caused inside RF chamber 514 removes the sodium chloride (NaCL) from saltwater. In the present embodiment, the saltwater remains still instead of flowing through RF chamber 514, as explained above using FIGS. 1, 2 and 3, for example.

Further, RF chamber 514 includes a plate member 528. Plate member 528 positions over RF chamber 514, as shown in FIG. 13. Plate member 528 comes in a transparent or semi-transparent manner and allows to see the nucleation process undergoing inside RF chamber 514 during its operation.

In accordance with the present invention, different molecules in the saltwater are targeted by changing the frequency. By targeting specific molecule at different frequency, it is possible to break the atom of molecular chain of any element (elements such as chlorine, hydrogen, oxygen, etc.). Under vacuum, the hydrogen bond is stretched almost to the point of breaking the molecule. Instead of applying high temperature, low pressure is applied to break the molecule. The hydrogen bonds are oscillated by continuous breaking of molecules which help to remove the sodium chloride from the saltwater. Here, the hydrogen molecules capture the chlorine (instead of sodium). This way, sodium chloride (NaCL) is removed from the saltwater. The sodium chloride is then used to make a variety of sodium-based byproducts and chlorine gas.

Figure 11:
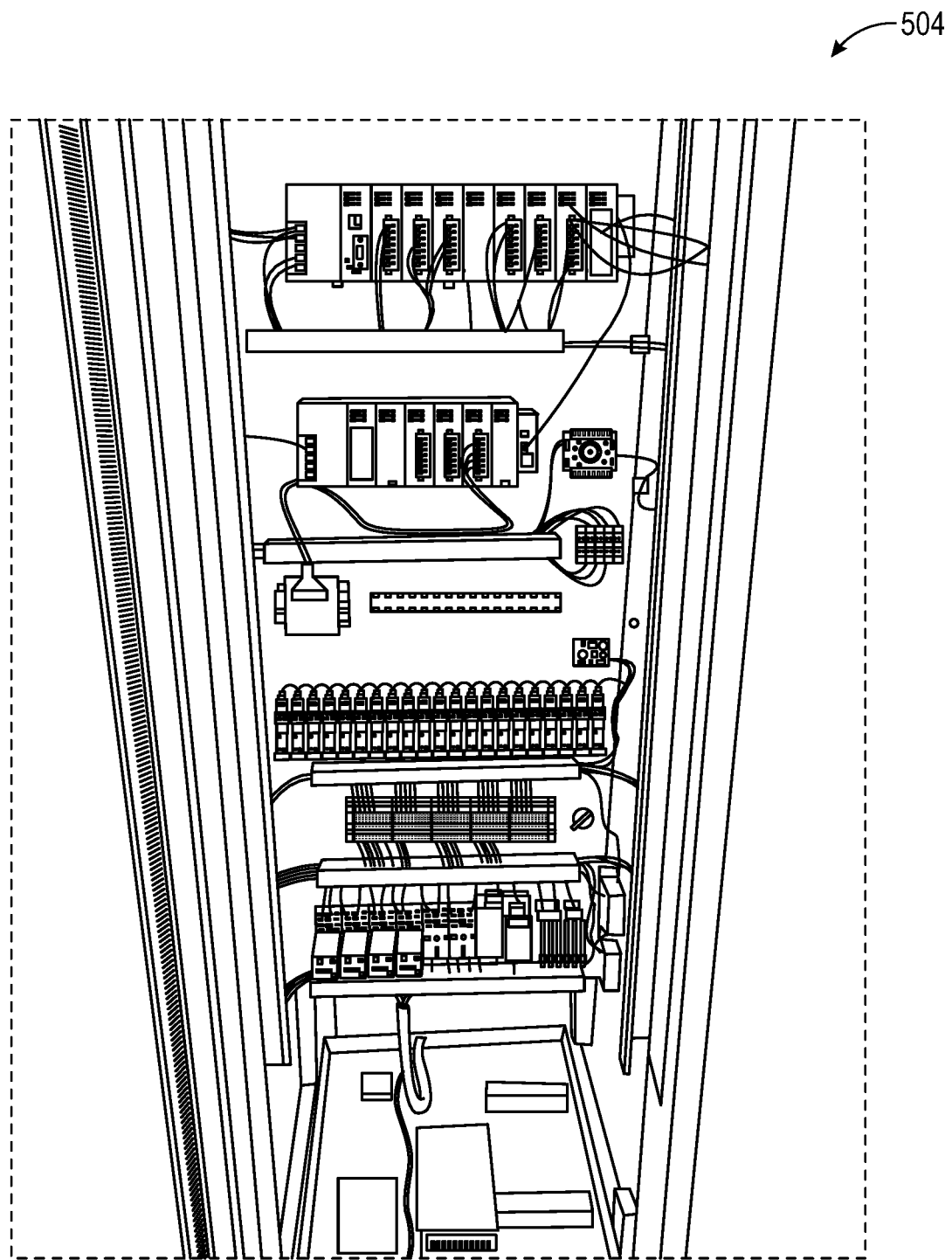
FIG. 11 illustrates a control system, in accordance with one exemplary embodiment of the present invention.
Figure 14:
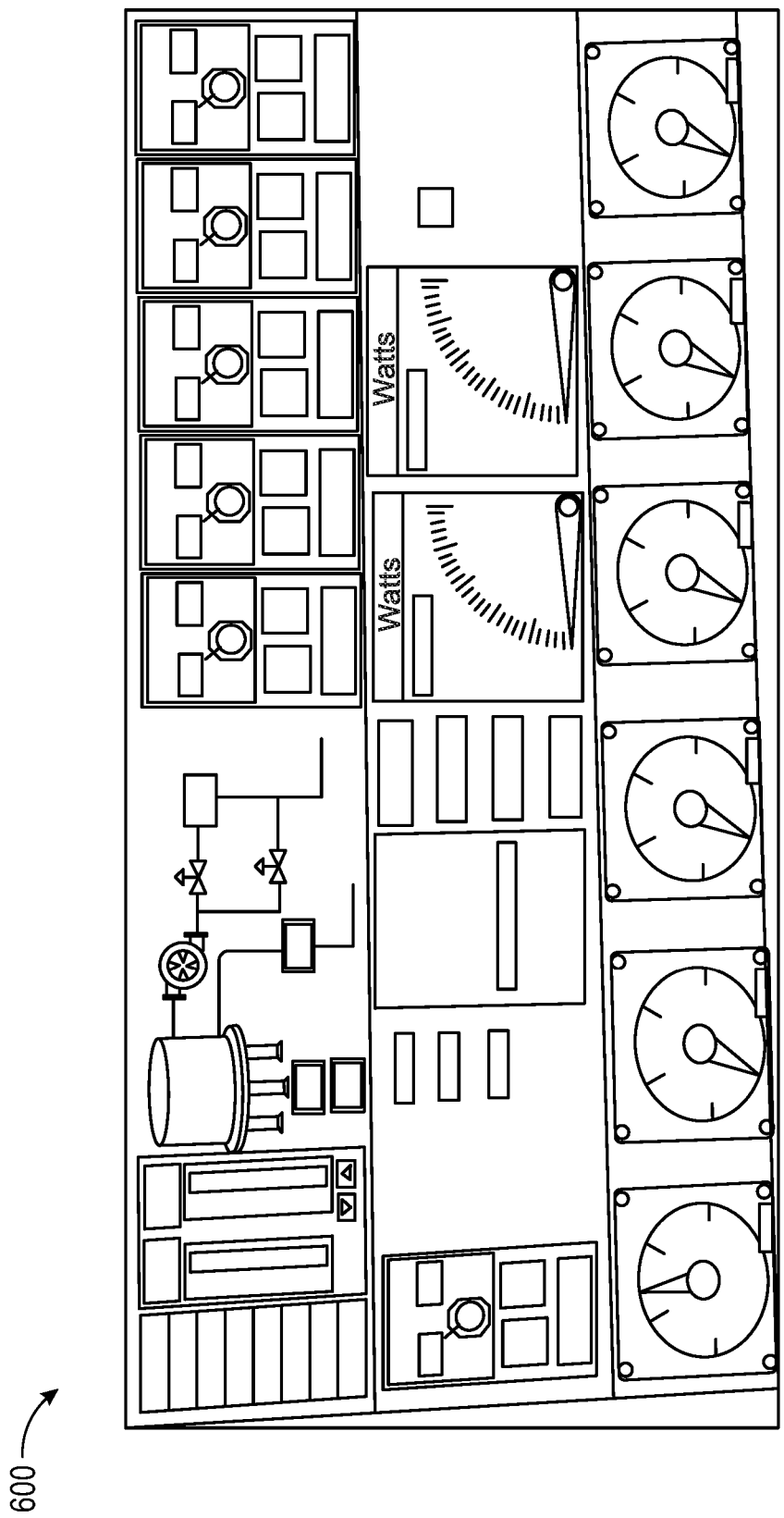
FIG. 14 illustrates an exemplary display showing operation and/or controls of the apparatus, in accordance with one exemplary embodiment of the present invention.

FIG. 11 shows a perspective view of control system 504, in accordance with one embodiment of the present invention. Further, FIG. 12 shows a perspective view of pump assembly 508. Pump assembly 508 includes a pump 530. Pump 530 connects to vacuum manifold 532 via vacuum tube 534. FIG. 14 shows an exemplary display 600 showing operation and/or controls of apparatus 500 during operation.

Based on the above, it is evident that the saltwater is treated by RF energy at a particular frequency to liberate chlorine isotope. Further, the chlorine isotope liberated is routed to and collected at the chlorine gas discharge system. Further, as the RF energy is focused towards the salt solution i.e., the water passing through the chamber tubes to capture remaining RF energy by the faraday cage. Further, the captured RF energy is directed to the power amplifier to resupply the RF energy. In alternate embodiment, different molecules in the saltwater are targeted by changing the frequency to break the atom of molecular chain of any element (elements such as chlorine, hydrogen, oxygen, etc.). Under vacuum, the hydrogen bond is stretched almost to the point of breaking the molecules. The hydrogen bonds are oscillated by continuous breaking of molecules which help to remove the sodium chloride from the saltwater. Here, the hydrogen molecules capture the chlorine (instead of sodium). This way, sodium chloride (NaCL) is removed from the saltwater. The sodium chloride is then used to make a variety of sodium-based byproducts and chlorine gas.

A person skilled in the art appreciates that the apparatus may come in a variety of shapes and sizes depending on the need and comfort of the user. Further, many changes in the design and placement of components may take place without deviating from the scope of the presently disclosed apparatus.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. An apparatus for treating salt water, said apparatus comprising;
    a feed tank for storing salt water;
    a Radio frequency (RF) chamber connecting said feed tank, wherein said RF chamber receives the salt water from said feed tank; and
    a RF system positioned in said RF chamber, wherein said RF system bombards RF energy at predefined frequencies on the salt water in said RF chamber to liberate chlorine isotope from the salt water, wherein said RF system bombards the RF energy to stretch hydrogen bond in the salt water to a point of breaking a molecule by applying low pressure such that the hydrogen bond captures chlorine, wherein said RF chamber positions inside a faraday cage, wherein the RF energy in excess bombarded on the salt water is captured by said faraday cage, and wherein said RF energy captured is directed to a power amplifier to resupply the RF energy on the salt water.

2. The apparatus of claim 1, wherein said RF chamber comprises a recirculation pipe, and wherein said recirculation pipe supplies excess salt water in said RF chamber back into the feed tank.

3. The apparatus of claim 1, wherein said RF chamber comprises an inlet for receiving the salt water from said feed tank, and an outlet for supplying the treated salt water.

4. The apparatus of claim 2, wherein said outlet connects to a treated water effluent manifold for collecting the treated salt water.

5. The apparatus of claim 1, wherein the RF system bombards RF energy at about 400 to 700 watts to stretch the hydrogen bond in the salt water to the point of breaking the molecule.

6. The apparatus of claim 1, wherein said RF chamber comprises an ultrasonic level indicator, a pH/carbon dioxide indicator, a temperature sensor, a conductivity indicator and a salt concentration indicator, wherein said ultrasonic level indicator determines salt water level in said RF chamber, wherein said pH/carbon dioxide indicator determines the pH level in the salt water in said RF chamber, wherein said temperature sensor determines the temperature of the salt water in said RF chamber, wherein said conductivity indicator determines sodium content in the salt water in said RF chamber, and wherein said salt concentration indicator determines salt concentration in the salt water.

7. The apparatus of claim 6, further comprises a control system, wherein said control system monitors the salt water level, the pH level, the temperature, the sodium content, and the salt concentration in the salt water in said RF chamber and controls said feed tank supplying the water, a recirculation pipe supplying excess salt water in said RF chamber back into the feed tank, and chemical make-up of the salt water in said RF chamber.

8. The apparatus of claim 1, further comprises a gas injection manifold, wherein said gas injection manifold stores chemicals including, but not limited to, carbon dioxide, carbon powder, and hydrogen gas.

9. The apparatus of claim 8, wherein said gas injection manifold connects to said RF chamber via an injector tube, and wherein said injector tube comprises an injector tube valve to control the flow of the chemicals injected into said RF chamber and to prevent a violent sodium-water reaction.

10. The apparatus of claim 1, wherein the RF energy breaks the ionic bond between sodium and chlorine molecules, and carbon dioxide bonds ionically with the sodium, clearing the chlorine from the salt water.

11. An apparatus for treating salt water, said apparatus comprising;
a feed tank for storing salt water;
a Radio frequency (RF) chamber connecting said feed tank, wherein said RF chamber receives the salt water from said feed tank;
a RF system positioned in said RF chamber; and
a control system electrically connected to said RF system, wherein said control system operates said RF system to bombard RF energy at about 400 to 700 watts to stretch hydrogen bond in the salt water to a point of breaking a molecule by applying low pressure, wherein the hydrogen bond captures chlorine, wherein said RF chamber comprises an ultrasonic level indicator, a pH/carbon dioxide indicator, a temperature sensor, a conductivity indicator and a salt concentration indicator, wherein said ultrasonic level indicator determines salt water level in said RF chamber, wherein said pH/carbon dioxide indicator determines the pH level in the saltwater in said RF chamber, wherein said temperature sensor determines the temperature of the salt water in said RF chamber, wherein said conductivity indicator determines sodium content in the salt water in said RF chamber, and wherein said salt concentration indicator determines salt concentration in the salt water.

12. The apparatus of claim 11, wherein said control system monitors the salt water level, the pH level, the temperature, the sodium content, and the salt concentration in the salt water in said RF chamber and controls said feed tank supplying the water, a recirculation pipe supplying excess salt water in said RF chamber back into the feed tank, and chemical make-up of the salt water in said RF chamber.

13. The apparatus of claim 11, further comprises a gas injection manifold, wherein said gas injection manifold stores chemical including, but not limited to, carbon dioxide, carbon powder, and hydrogen gas, wherein said gas injection manifold connects to said RF chamber via an injector tube, and wherein said injector tube comprises an injector tube valve to control the flow of the chemicals injected into said RF chamber.

14. A method of treating water, said method comprising the steps of:
receiving salt water at a Radio frequency (RF) chamber;
providing a RF system in said RF chamber;
providing the salt water in said RF chamber;
bombarding RF energy at the salt water for stretching hydrogen bond in the salt water to a point of breaking a molecule by applying low pressure such that the hydrogen bond captures chlorine;
collecting the chlorine at a chlorine gas discharge system; and
collecting water at a water effluent manifold.

15. The method of claim 14, further comprising injecting gas into said RF chamber for preventing a violent sodium-water reaction.

16. The method of claim 14, further comprising providing a control system for monitoring salt water level, pH level, temperature, sodium content, and salt concentration in the salt water in said RF chamber.

* * * * *